(12) United States Patent
Morita

(10) Patent No.: US 9,612,787 B2
(45) Date of Patent: Apr. 4, 2017

(54) INFORMATION PROCESSING APPARATUS AND CONTROL METHOD THEREOF

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/679,333

(22) Filed: Apr. 6, 2015

(65) Prior Publication Data

US 2015/0301767 A1    Oct. 22, 2015

(30) Foreign Application Priority Data

Apr. 18, 2014    (JP) .................................. 2014-086801

(51) Int. Cl.
*G06F 3/12*    (2006.01)

(52) U.S. Cl.
CPC .......... *G06F 3/1285* (2013.01); *G06F 3/1205* (2013.01); *G06F 3/1253* (2013.01)

(58) Field of Classification Search
None
See application file for complete search history.

(56) References Cited

U.S. PATENT DOCUMENTS

| | | | | |
|---|---|---|---|---|
| 6,026,436 A * | 2/2000 | Hawes | ................... | G06F 17/218 709/218 |
| 6,757,500 B2 * | 6/2004 | Kuboki | .............. | H04N 1/00013 399/15 |
| 7,693,935 B2 * | 4/2010 | Weber | ................. | H04L 12/2805 709/203 |
| 8,432,566 B2 * | 4/2013 | Adachi | ................. | G06F 3/1208 347/104 |
| 8,446,623 B2 * | 5/2013 | Masuyama | ........... | G06F 3/1205 340/540 |
| 8,850,478 B2 * | 9/2014 | Moshiri | ............. | H04N 5/44513 725/39 |
| 8,860,970 B2 * | 10/2014 | Kuroyanagi | ....... | H04N 1/00453 358/1.13 |
| 8,941,867 B2 * | 1/2015 | Suzuki | .................. | G06F 3/1205 358/1.13 |
| 9,076,086 B2 * | 7/2015 | Fujishita | .............. | G06K 15/005 |
| 9,094,548 B2 * | 7/2015 | Tsuya | ................... | H04N 1/0035 |

(Continued)

FOREIGN PATENT DOCUMENTS

JP    2012-123778 A    6/2012

*Primary Examiner* — Ted Barnes
(74) *Attorney, Agent, or Firm* — Fitzpatrick, Cella, Harper & Scinto

(57) ABSTRACT

To preferably present setting values serving as choices of a setting item on a print setting screen, an information processing apparatus comprises: a first setting unit configured to accept setting of a setting value to a predetermined print setting item via a first user interface screen configured to select one setting value from a first set including a plurality of setting values; a second setting unit configured to accept setting of a setting value to the predetermined print setting item via a second user interface screen configured to select one setting value from a second set serving as a subset of the first set; and an addition unit configured to, if the setting value set by the first setting unit is not included in the second set, add the setting value set by the first setting unit to the second set.

19 Claims, 17 Drawing Sheets

(56) References Cited

U.S. PATENT DOCUMENTS

| | | | |
|---|---|---|---|
| 9,207,846 B2* | 12/2015 | Ichiyama | H04N 1/00307 |
| 9,232,089 B2* | 1/2016 | Nishiyama | H04N 1/00381 |
| 9,250,833 B2* | 2/2016 | Kim | G06F 3/1205 |
| 2005/0094200 A1* | 5/2005 | Uekusa | G06F 3/1255 358/1.15 |
| 2006/0221407 A1* | 10/2006 | Uchida | H04N 1/00222 358/448 |
| 2006/0285142 A1* | 12/2006 | Cho | G06F 3/1205 358/1.13 |
| 2007/0103714 A1* | 5/2007 | Ushiku | G06F 21/608 358/1.14 |
| 2007/0216944 A1* | 9/2007 | Furuya | G06F 3/1212 358/1.15 |
| 2008/0162629 A1* | 7/2008 | Ashida | G06F 3/1205 709/203 |
| 2008/0180741 A1* | 7/2008 | Miyata | G06F 3/1205 358/1.15 |
| 2008/0239373 A1* | 10/2008 | Suzuki | G06F 3/1208 358/1.15 |
| 2008/0297838 A1* | 12/2008 | Matsui | G06F 3/1204 358/1.15 |
| 2009/0323101 A1* | 12/2009 | Saito | H04N 1/00416 358/1.15 |
| 2010/0033744 A1* | 2/2010 | Maeda | H04N 1/00204 358/1.9 |
| 2010/0088639 A1* | 4/2010 | Yach | G06F 1/1626 715/825 |
| 2010/0214588 A1* | 8/2010 | Nakahara | G06F 3/1204 358/1.13 |
| 2011/0138274 A1* | 6/2011 | Hoshino | G06F 17/243 715/273 |
| 2011/0141505 A1* | 6/2011 | Haga | G06F 3/1219 358/1.9 |
| 2011/0234839 A1* | 9/2011 | Tomii | H04N 1/00395 348/222.1 |
| 2011/0249290 A1* | 10/2011 | Hayber | G06F 3/121 358/1.15 |
| 2011/0267634 A1* | 11/2011 | Fukuoka | H04N 1/00408 358/1.13 |
| 2011/0292429 A1* | 12/2011 | Morskate | H04N 1/00225 358/1.13 |
| 2012/0002222 A1* | 1/2012 | Ohara | G06F 3/1205 358/1.9 |
| 2012/0057203 A1* | 3/2012 | Maeda | G06F 3/1205 358/1.15 |
| 2012/0120443 A1* | 5/2012 | Aritomi | G06F 3/1205 358/1.15 |
| 2012/0194844 A1* | 8/2012 | Natori | G06F 3/1205 358/1.13 |
| 2012/0212776 A1* | 8/2012 | Murata | G06F 3/1205 358/1.15 |
| 2012/0257234 A1* | 10/2012 | Kanuma | H04N 1/32112 358/1.13 |
| 2012/0274968 A1* | 11/2012 | Han | G03G 15/502 358/1.13 |
| 2012/0284602 A1* | 11/2012 | Seed | G06Q 20/3274 715/224 |
| 2012/0284620 A1* | 11/2012 | Yach | G06F 1/1626 715/716 |
| 2013/0033727 A1* | 2/2013 | Suzuki | G06F 3/1205 358/1.15 |
| 2013/0038887 A1* | 2/2013 | Yamada | G06F 3/1205 358/1.13 |
| 2013/0077115 A1* | 3/2013 | Ozaki | H04N 1/00225 358/1.13 |
| 2013/0083358 A1* | 4/2013 | Suzuki | H04N 1/00411 358/1.15 |
| 2013/0084009 A1* | 4/2013 | Lundberg | G06F 17/27 382/182 |
| 2013/0135668 A1* | 5/2013 | Minagawa | G06F 3/1204 358/1.15 |
| 2014/0168676 A1* | 6/2014 | Genda | G06F 3/1208 358/1.9 |
| 2014/0198332 A1* | 7/2014 | You | G06F 3/1205 358/1.13 |
| 2014/0211220 A1* | 7/2014 | Utsubo | H04N 1/00225 358/1.6 |
| 2014/0215097 A1* | 7/2014 | Yamamoto | G06F 9/4411 710/8 |
| 2014/0250012 A1* | 9/2014 | Wolfe | G06Q 20/28 705/44 |
| 2014/0253937 A1* | 9/2014 | Fujishita | H04N 1/00413 358/1.13 |
| 2015/0062633 A1* | 3/2015 | Asai | G06F 3/1236 358/1.15 |
| 2015/0109630 A1* | 4/2015 | Hiramoto | G03G 15/502 358/1.13 |
| 2015/0172483 A1* | 6/2015 | Kishida | H04N 1/00474 358/1.13 |
| 2015/0178029 A1* | 6/2015 | Miyazawa | G06F 3/1253 358/1.15 |
| 2015/0186087 A1* | 7/2015 | Miyazawa | G06F 3/1253 358/1.15 |
| 2015/0212769 A1* | 7/2015 | Norota | G06F 3/1253 358/1.15 |
| 2015/0222770 A1* | 8/2015 | Yoshida | H04N 1/00517 358/1.15 |
| 2015/0242722 A1* | 8/2015 | Watanabe | G06F 3/1205 358/1.15 |
| 2015/0261480 A1* | 9/2015 | Omura | G06F 3/1231 358/1.13 |
| 2015/0261489 A1* | 9/2015 | Aoki | G06F 3/1275 358/1.15 |
| 2015/0281500 A1* | 10/2015 | Mori | H04N 1/00928 358/1.15 |
| 2015/0347068 A1* | 12/2015 | Proehl | G06F 3/1204 358/1.14 |
| 2015/0355865 A1* | 12/2015 | Ohara | G06F 3/1205 358/1.15 |

* cited by examiner

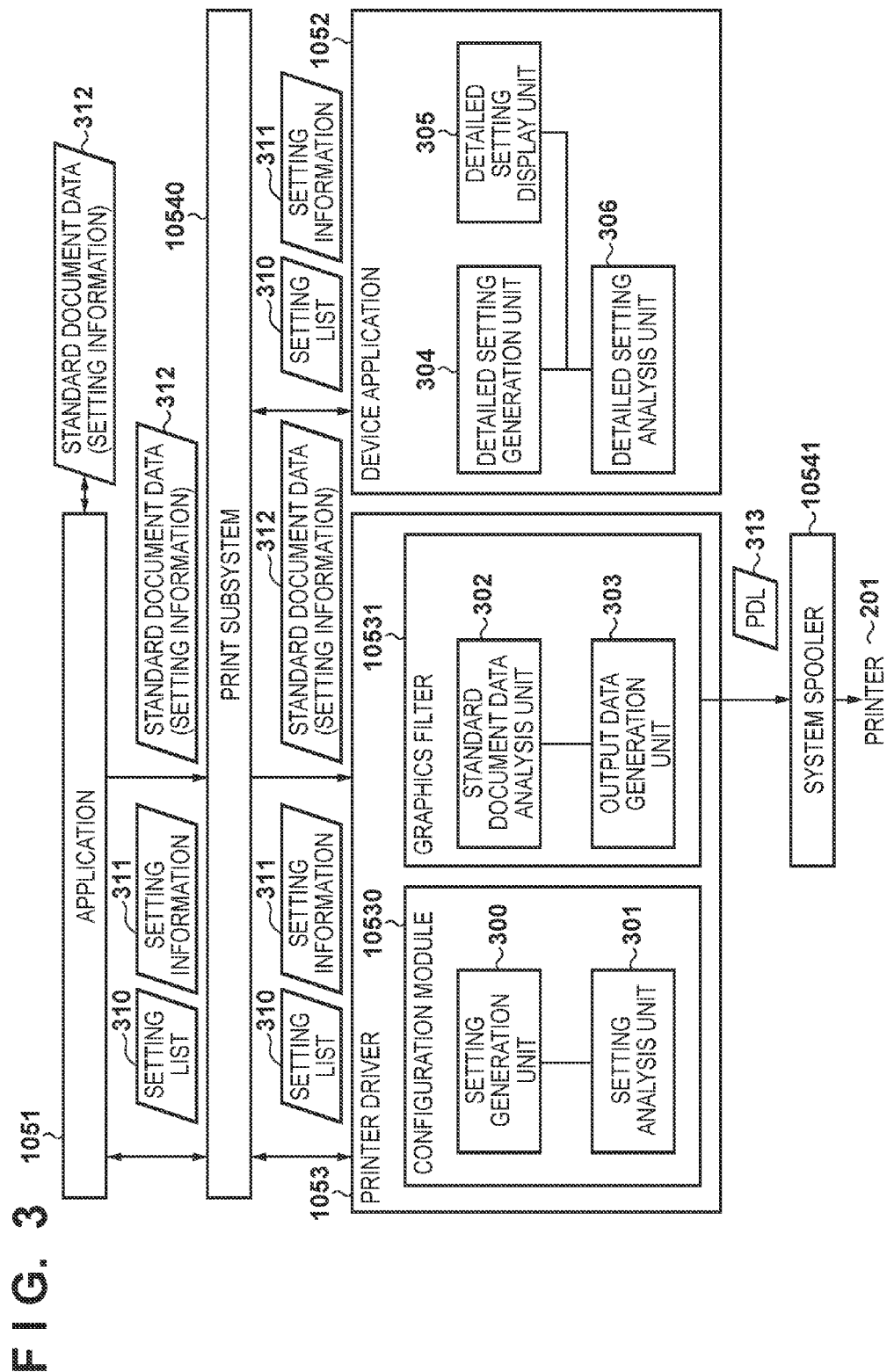

FIG. 4

```
<?xml version="1.0" encoding="UTF-8"?>
<psf:PrintCapabilities ... >                                              401

<psf:Feature name="psk:PageMediaSize">
    <psf:Property name="psk:DisplayName">
      <psf:Value xsi:type="xsd:string">ORIGINAL SIZE</psf:Value>
    </psf:Property>
    ...                       403
    <psf:Option name="psk:NorthAmericaLetter" constrained="psk:None">
      <psf:Property name="psk:DisplayName">
        <psf:Value xsi:type="xsd:string">LETTER</psf:Value>
      ...
    </psf:Option>
    <psf:Option name="psk:NorthAmericaTabloid" constrained="psk:None">
      <psf:Property name="psk:DisplayName">
        <psf:Value xsi:type="xsd:string">LEDGER</psf:Value>
      ...
  </psf:Feature>
  ...
</psf:PrintCapabilities>
```

310

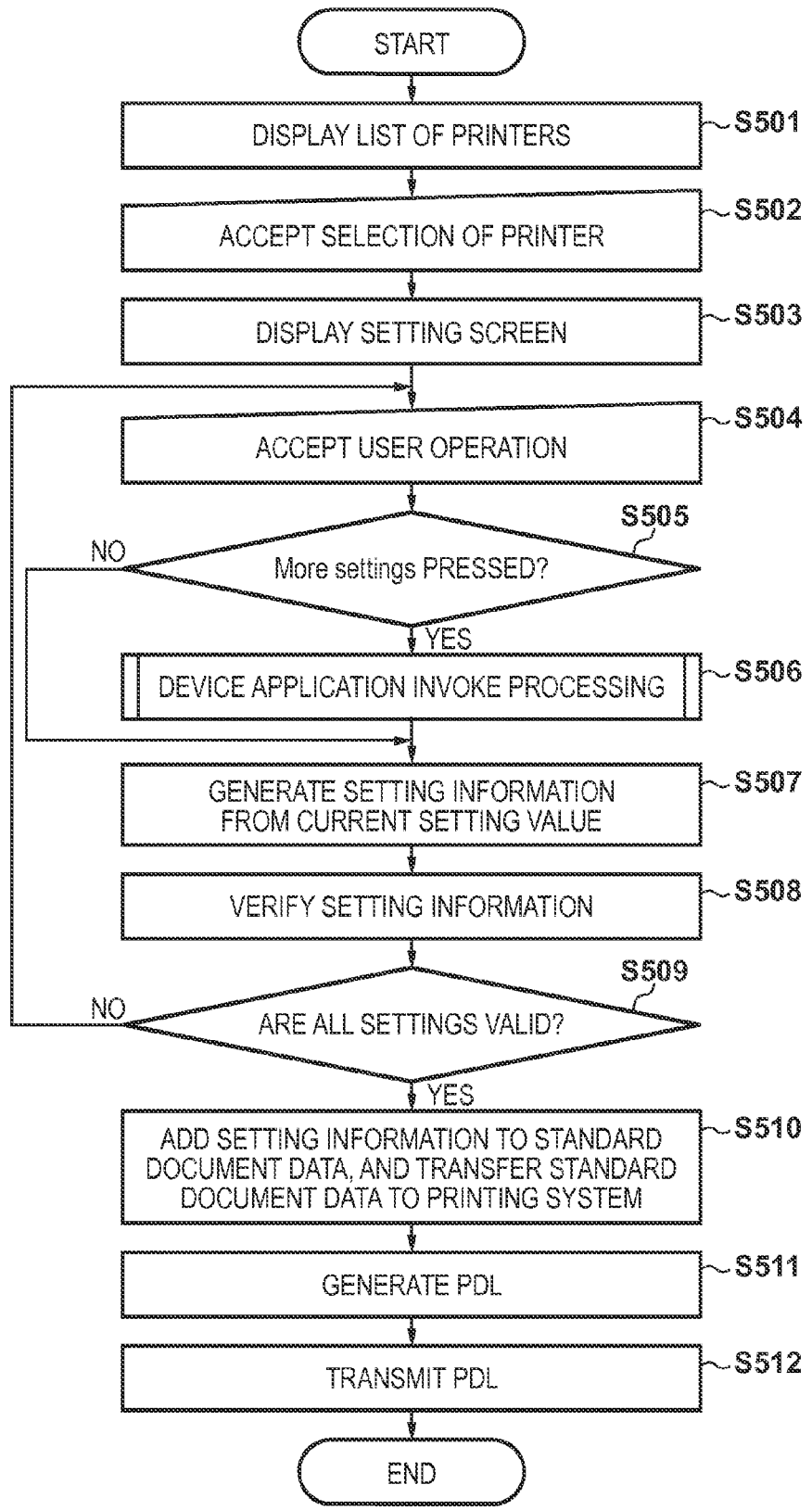

FIG. 7A

<EASY SETTINGS>

PLAIN PAPER
PHOTO PAPER
MATTE PHOTO PAPER
POSTCARD
HIGH-QUALITY
DEDICATED PAPER

<FULL-FUNCTION SETTINGS>

PLAIN PAPER
PHOTO PAPER
PHOTO PAPER GLOSSY GOLD
GLOSSY PRO PLATINUM GOLD
PHOTO PAPER MATTE
PHOTO PAPER GLOSSY
MATTE PHOTO PAPER
ENVELOPE
POSTCARD
ALL POSTCARDS (ADDRESS SIDE)
INKJET POSTCARD (CORRESPONDENCE SIDE)
PHOTO POSTCARD GLOSSY (CORRESPONDENCE SIDE)
HIGH-QUALITY DEDICATED PAPER
T-SHIRT TRANSFER PAPER
SWELLING PAPER

FIG. 7B

<EASY SETTINGS>

UPPER LEFT(ONE PORTION)
LEFT SIDE(TWO PORTIONS)
UPPER SIDE(TWO PORTIONS)

<FULL-FUNCTION SETTINGS>

UPPER LEFT(ONE PORTION)
LOWER LEFT(ONE PORTION)
LEFT SIDE(TWO PORTIONS)
UPPER RIGHT(ONE PORTION)
LOWER RIGHT(ONE PORTION)
RIGHT SIDE(TWO PORTIONS)
UPPER SIDE(TWO PORTIONS)
LOWER SIDE(TWO PORTIONS)
SADDLE STITCH

FIG. 7C

<EASY SETTINGS>

1 in 1
2 in 1
4 in 1
4 in 1

<FULL-FUNCTION SETTINGS>

1 in 1
2 in 1
4 in 1
6 in 1
8 in 1
9 in 1
16 in 1

FROM UPPER LEFT TO RIGHT
FROM UPPER LEFT TO BOTTOM
FROM UPPER RIGHT TO LEFT
FROM UPPER RIGHT TO BOTTOM 701  702  703

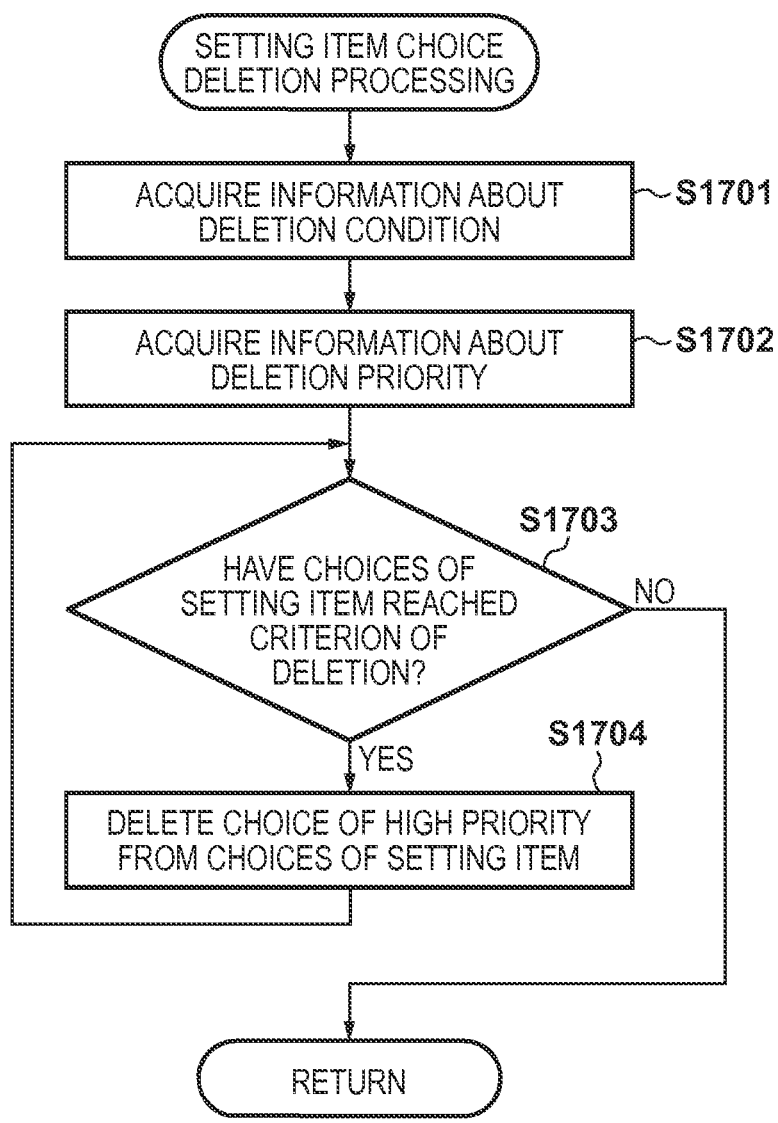

INFORMATION PROCESSING APPARATUS AND CONTROL METHOD THEREOF

BACKGROUND OF THE INVENTION

Field of the Invention

The present invention relates to a print setting technique.

Description of the Related Art

A printer driver has a user interface (UI) for accepting detailed print settings from a user. In a conventional print setting processing system, when printing by an application, the user invokes the UI of the printer driver via a button for making detailed settings by the user.

Recently, an increasing number of devices are equipped with a touch panel thanks to the development of tablets and mobile devices such as a mobile phone. UIs capable of operations not only suited to a conventional computer but also suited to a touch panel have also been developed for an operating system (OS). Note that a conventional UI screen will be called a desktop UI or desktop UI environment. A UI screen optimized for a touch panel will be called a touch panel UI or touch panel UI environment.

When creating a UI suited to a touch panel, the UI needs to be designed so that it can be handled more simply and clearly by a small number of operations by, for example, arranging each control (display content) to be displayed large, or decreasing the number of choices of a control. For example, in Japanese Patent Laid-Open No. 2012-123778 (patent literature 1), frequently used setting items are provided to a user by arranging a model-independent common setting screen in addition to a model-dependent individual setting UI. On the common setting screen, the user can perform a setting operation with a constant sense of use and make settings by a small number of operations. This improves the user operability.

However, if only the touch panel UI with a small number of choices of a control is displayed as the UI, the user friendliness becomes poor for a user who wants to make more detailed settings. Therefore, this specification will examine a method of switching the UI by a user between the touch panel UI with a small number of choices of a control and the desktop UI with a large number of choices of a control. When this method is employed, it is more user-friendly to keep displaying, even on the touch panel UI, a choice selected once on the desktop UI.

In patent literature 1, model-dependent unique parameters and the like are not displayed among choices settable as the parameters of setting items because of the property in which the common setting screen does not depend on the model. That is, when a model-specific parameter is set on the model-dependent individual setting UI side, the common setting screen does not have the value of a parameter to be displayed, and the current setting value is not displayed.

SUMMARY OF THE INVENTION

According to one aspect of the present invention, an information processing apparatus that performs setting of a print setting item used in a printing device, comprises: a first setting unit configured to accept setting of a setting value to a predetermined print setting item via a first user interface screen configured to select one setting value from a first set including a plurality of setting values; a second setting unit configured to accept setting of a setting value to the predetermined print setting item via a second user interface screen configured to select one setting value from a second set serving as a subset of the first set; and an addition unit configured to, if the setting value set by the first setting unit is not included in the second set, add the setting value set by the first setting unit to the second set, wherein the first user interface screen and the second user interface screen are displayed by selecting a link arranged on a print setting screen provided by an operating system running in the information processing apparatus.

The present invention can provide a technique capable of preferably presenting setting values serving as choices of a setting item on a print setting screen.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram showing the software arrangement of the client computer;

FIG. 4 is a view showing the structure of data exchanged between software modules;

FIG. 5 is a flowchart of printing according to the first embodiment;

FIGS. 7A to 7C are views showing examples of choices in various setting items;

FIG. 17 is a flowchart showing setting item choice deletion processing.

DESCRIPTION OF THE EMBODIMENTS

Embodiments of the present invention will now be described in detail with reference to the accompanying drawings. Note that the following embodiments are merely examples and are not intended to limit the scope of the present invention.

(First Embodiment)

A client computer having two types of user interfaces (UIs) will be exemplified and described below as the first embodiment of an information processing apparatus according to the present invention.

Figure 1:
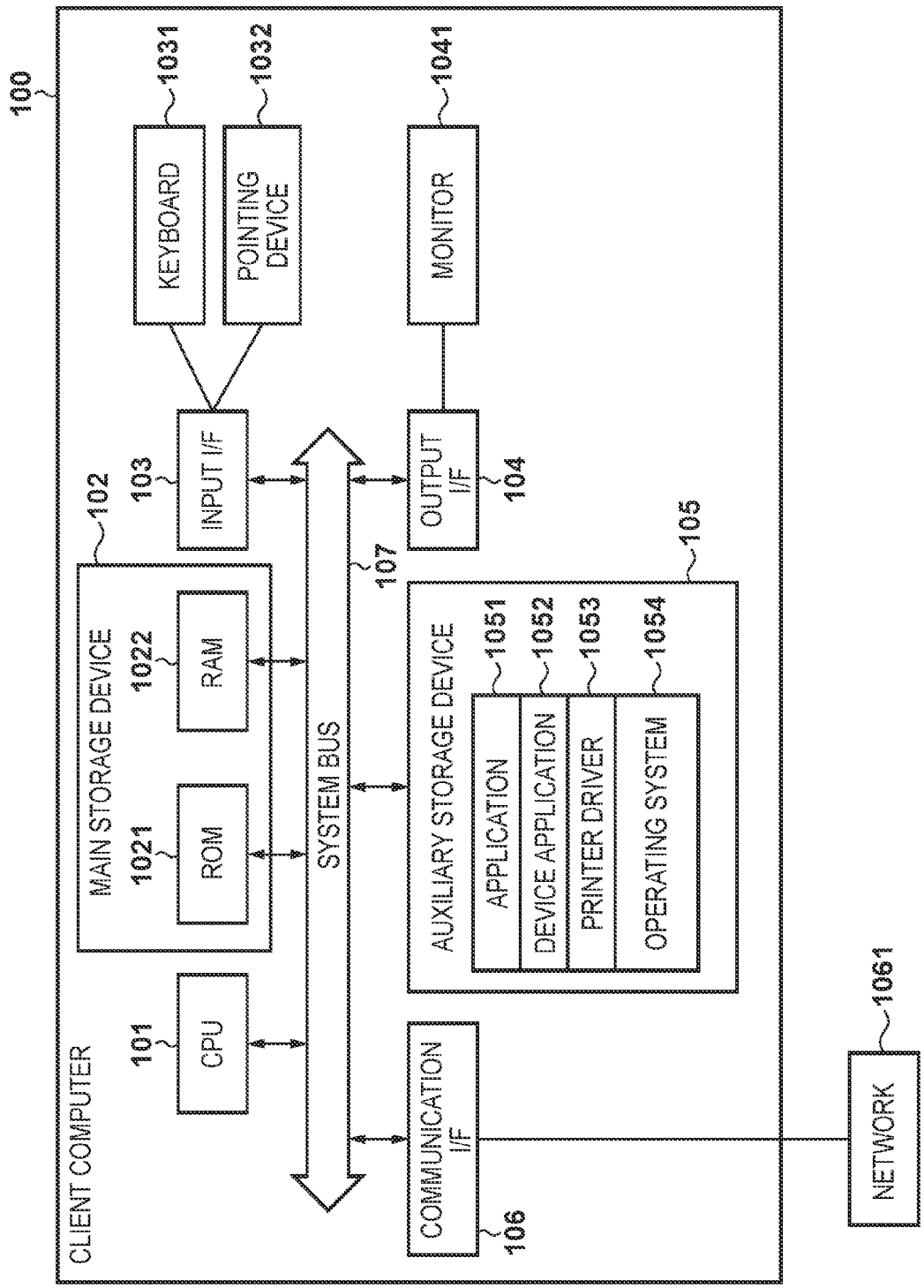
FIG. 1 is a block diagram showing a client computer according to the first embodiment.

FIG. 1 is a block diagram showing the client computer (to be referred to as a computer hereinafter) according to the first embodiment. A CPU (Central Processing Unit) 101 controls an overall computer 100 according to a program stored in a ROM (Read Only Memory) 1021 or RAM (Random Access Memory) 1022 of a main storage device 102 or an auxiliary storage device 105. The RAM 1022 is also used as a work area when the CPU 101 performs each processing.

The auxiliary storage device 105 stores various programs such as an application 1051, a device application 1052, a printer driver 1053, and an OS 1054. Input devices such as a keyboard 1031 and a pointing device 1032 typified by a mouse or touch panel are connected to the computer 100 via an input interface (I/F) 103. An output device such as a monitor 1041 is connected to an output I/F 104, and displays a UI on the monitor in accordance with an instruction from a program. Operations from a user to programs are accepted through these input and output devices. A communication I/F 106 is connected to a network 1061 and can communicate with external devices of the computer 100 (for example, a computer 202 and a printer 201 in FIG. 2).

The above-mentioned functional units (modules) are connected by a system bus 107, and data can be exchanged between the respective modules. Various programs including processes to be described later can be added to the auxiliary storage device 105 via a CD-ROM and USB memory (neither is shown). These programs can also be added to the auxiliary storage device 105 via the network 1061. This system may be a system constituted by a single device or a plurality of devices, or a system in which connection is performed via a network such as a LAN (Local Area Network) or WAN (Wide Area Network) and processing is performed.

Figure 2:
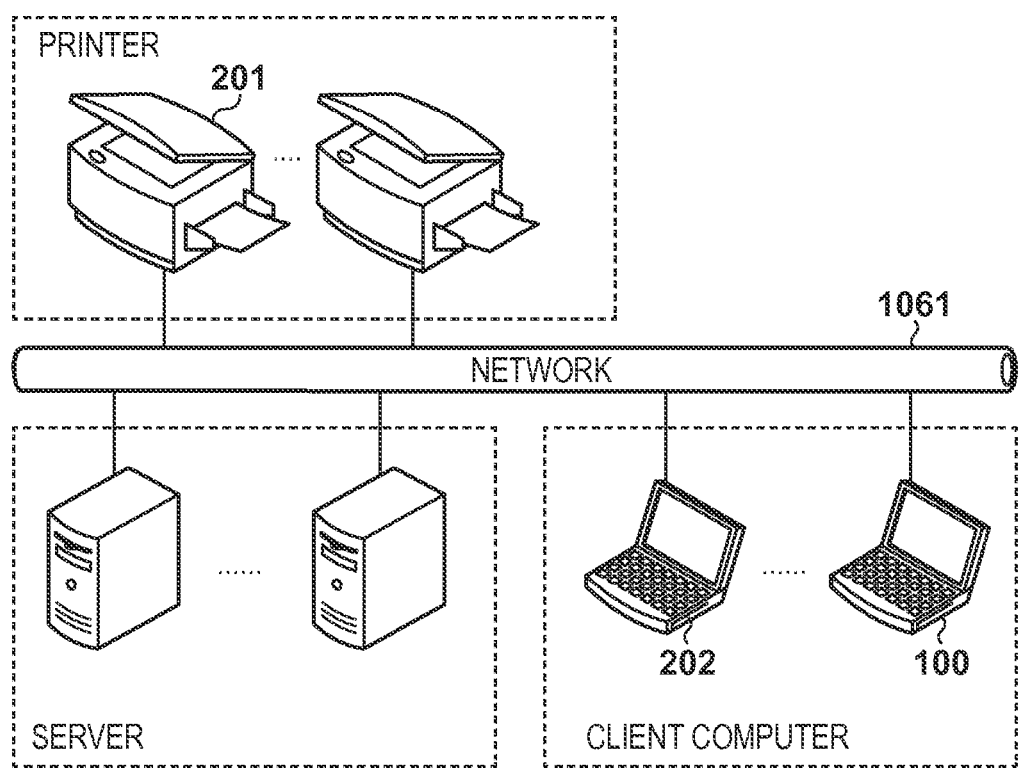
FIG. 2 is a view showing the overall arrangement of a system including the client computer according to the first embodiment.

FIG. 2 is a view showing the overall arrangement of the system including the client computer according to the first embodiment. One or a plurality of the computers 100/202 that create documents and images to be printed are connected to a network. One or a plurality of printers 201 are sometimes connected to the network. Networks vary from a small-scale one such as a PAN (Personal Area Network) or LAN to a large-scale one, and these devices are connected to all networks. Note that a server and a printer may be connected over the Internet by cloud networking.

FIG. 3 is a block diagram showing the software arrangement of the client computer. The client computer roughly includes the application 1051, a print subsystem 10540, the printer driver 1053, a system spooler 10541, and the device application 1052.

These software modules are stored in the auxiliary storage device 105, loaded from the auxiliary storage device 105 to the RAM 1022 in accordance with a user request or another system request, and executed by the CPU 101. The application 1051 is a general application such as a word processor or a browser. The application 1051 displays a UI on the monitor 1041, and accepts a print request from a user via an input device such as the pointing device 1032 or the keyboard 1031. Upon receiving the print request from the user, the application 1051 issues a print request to the print subsystem 10540.

The print subsystem 10540 is the subsystem of the OS 1054, is positioned between the application 1051 and the printer driver 1053, and executes common processing in print processing. More specifically, this processing includes selection of a printing target printer, and generation of setting information using the selected printer driver 1053. The print subsystem 10540 also performs conversion into print data described in a page description language (PDL) interpretable by the printer.

The printer driver 1053 is a module which has charge of processing depending on a printout destination printer. The printer driver 1053 roughly includes two submodules: One is a configuration module 10530 that creates setting-related information and performs creation processing of setting information implementable by the printer 201, and the other is a graphics filter 10531. The graphics filter 10531 receives, from the application 1051 via the print subsystem 10540, standard document data that includes setting information and is generally interpretable by a printer, and converts the data into PDL data interpretable by the printer 201. The converted PDL data is transferred to the system spooler 10541 serving as the subsystem of the OS 1054, and transmitted to the printer 201.

The device application 1052 is the auxiliary application of the printer driver 1053. Similar to the printer driver 1053, the device application 1052 is software compatible with the printer 201, and can interpret a setting list and setting items specific to each printer driver. The device application 1052 includes a detailed setting display unit 305 and a setting analysis unit 306.

FIG. 4 is a view showing an example of data exchanged between software modules. These data are described in the form of an extensible markup language (XML).

A setting list 310 describes the ability of a device. More specifically, the setting list 310 describes a list of print setting items implementable by the printer 201 and a list of choices of the respective items. A setting item 401 in the setting list 310 defines standard settings in advance, and the specification is generally open to the public. The setting list 310 describes almost all general functions of home and office printers. By reading the setting list 310, the general application 1051 can acquire printer functions and generate a print setting UI.

The printer driver 1053, for example, the printer driver 1053 installed via a desktop UI can be used even from the application of a touch panel UI. The user can input a print instruction even from the application of the touch panel UI by using the printer driver 1053 (also called a desktop printer driver) created for the desktop UI. As a result, the printer driver 1053 for the desktop UI can generate print data by using rendering data issued from the application of the touch panel UI.

FIG. 5 is a flowchart for explaining an outline of print processing according to the first embodiment. This processing starts when the application 1051 first issues a print request to the print subsystem 10540 upon receiving a print request from a user.

In step S501, the print subsystem 10540 displays a UI (not shown) representing a list of printers capable of printing based on information of the currently installed printer driver 1053.

In step S502, the print subsystem 10540 receives selection of an output printer by the user on the UI representing the list of printers, and loads the printer driver 1053 of this printer from the auxiliary storage device 105 to the RAM 1022.

In step S503, the print subsystem 10540 requests the printer driver 1053 to generate a list of settable items (to be referred to as the setting list 310 hereinafter) and the currently set information (to be referred to as setting information 311 hereinafter). A setting generation unit 300 of the configuration module 10530 generates these pieces of information.

Figure 6:
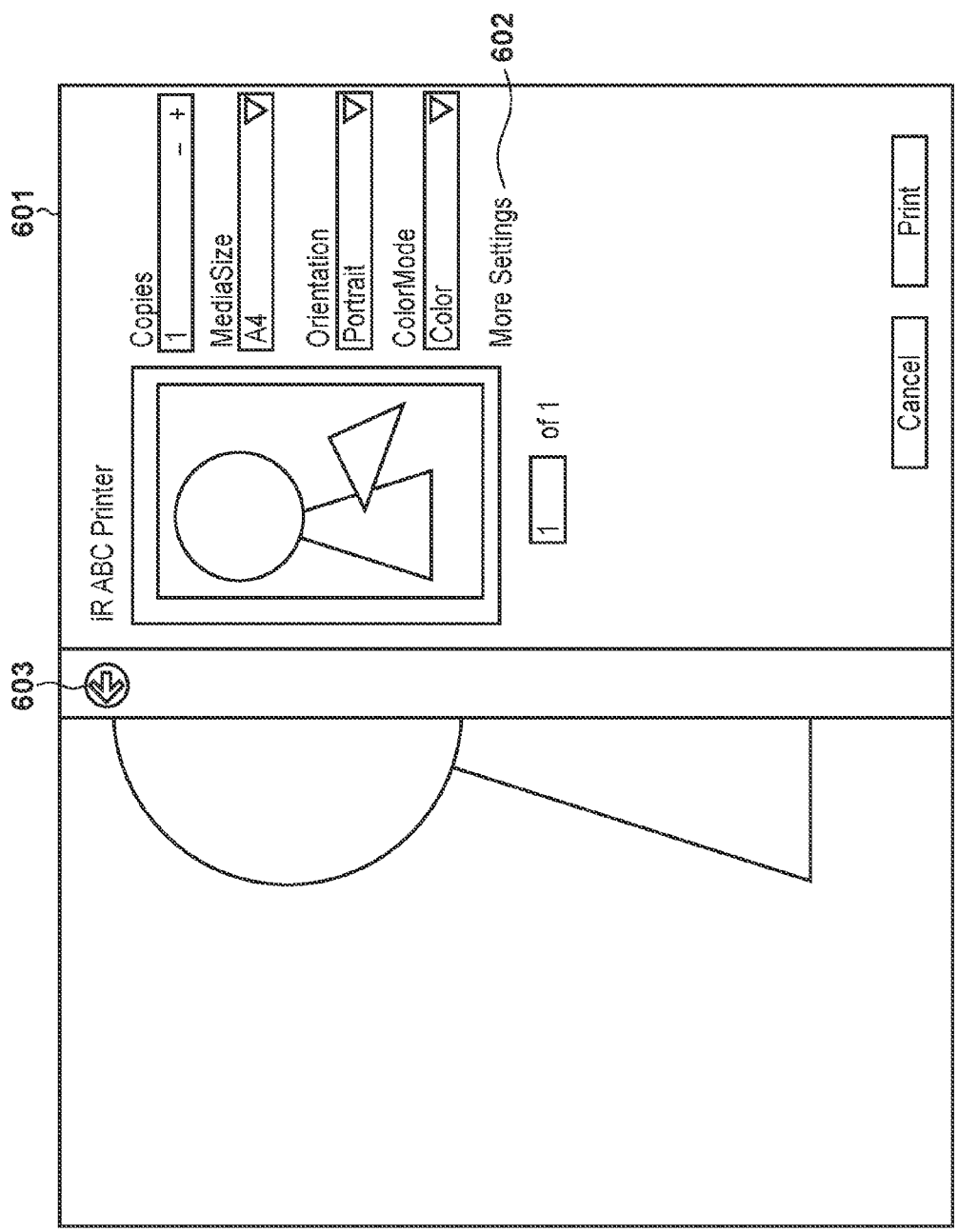
FIG. 6 is a view showing an example of a touch panel print setting UI.

FIG. 6 is a view showing an example of a print setting screen 601 serving as a touch panel print setting UI. The print subsystem 10540 constitutes the print setting screen 601 based on the generated setting list 310 and the current setting information 311, and displays the print setting screen 601 on the monitor 1041.

In step S504, the print subsystem 10540 accepts an operation from the user to the print setting screen 601.

In step S505, the print subsystem 10540 determines whether a "More Settings" link 602 of the print setting screen 601 has been pressed.

If the print subsystem 10540 determines that the "More Settings" link 602 has been pressed, it invokes the device application 1052 in step S506. The processing in step S506 at this time will be described later. If the print subsystem 10540 determines that the "More Settings" link 602 has not been pressed, it advances to step S507.

In step S507, the print subsystem 10540 transfers the current setting information 311 to the printer driver 1053 in response to pressing of a return button 603 of the print setting screen 601.

In step S508, the configuration module 10530 of the printer driver 1053 verifies the setting information 311 by using a setting analysis unit 301.

In step S509, the print subsystem 10540 determines, based on the result of verification, whether all setting values are valid. If all settings are valid, the print subsystem 10540 closes the print setting screen 601 and shifts the process to step S510. If not all settings are valid, the print subsystem 10540 shifts to step S504 to accept a user operation.

In step S510, the print subsystem 10540 creates a standard document to be printed, and adds the setting information 311. This standard document is one generally interpretable by the printer, for example, PDL data. The print subsystem 10540 outputs the standard document data including the setting information 311 to the graphics filter 10531.

In step S511, the graphics filter 10531 of the printer driver 1053 analyzes the received standard document data by using a standard document data analysis unit 302. The graphics filter 10531 converts the standard document data into PDL data interpretable by the printer 201 by using an output data generation unit 303.

In step S512, the graphics filter 10531 transfers the converted PDL data to the system spooler 10541 serving as the subsystem of the OS 1054. The system spooler 10541 sequentially transmits the PDL data to the printer 201.

Figure 11:
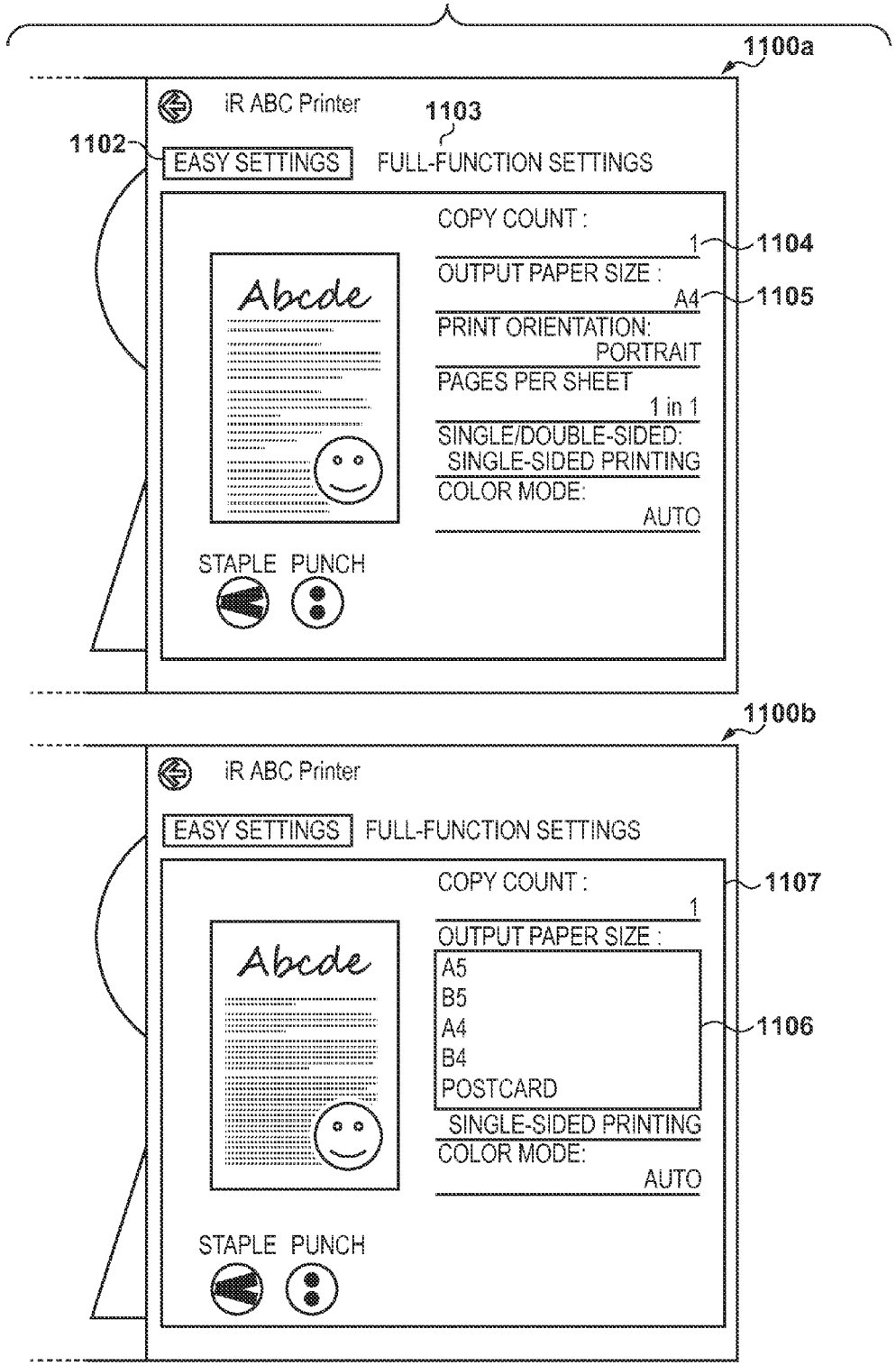
FIG. 11 is a view showing an example of the easy setting screen.
Figure 12:
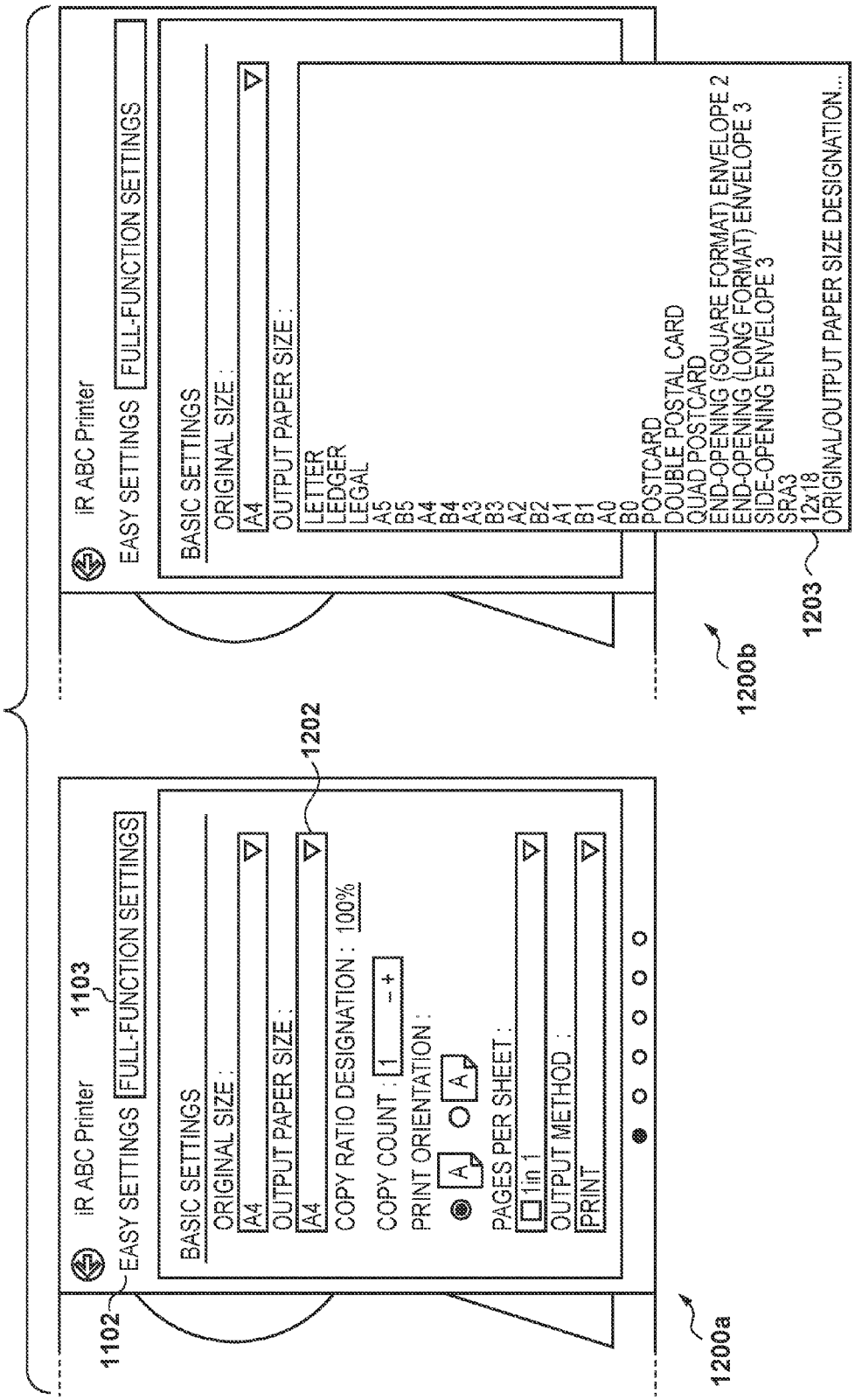
FIG. 12 is a view showing an example of the full-function setting screen.

Subsequently, display processing by the device application 1052 will be explained. Before the description of the display processing, an explanation regarding the screen of the device application 1052 will be made. As two user interface screens for performing setting, the device application 1052 includes easy setting screens 1100a and 1100b (to be also referred to as an easy setting screen 1100 hereinafter) exemplified in FIG. 11, and full-function setting screens 1200a and 1200b (to be also referred to as a full-function setting screen 1200 hereinafter) exemplified in FIG. 12. These two user interface screens can be switched between them in response to pressing of buttons 1102 and 1103. The device application 1052 has items for inputting parameters to the device, and the respective items are called setting items (print setting items).

In the example of the easy setting screen 1100a, there are a setting item 1104 for setting a copy count, and a setting item 1105 for setting an output paper size. Parameters set in these setting items are called setting values. In the example of the easy setting screen 1100a, a parameter "A4" is a setting value for the setting item 1105. This setting item allows inputting a text, or inputting a numerical value by operating a spin button. This setting item also allows inputting a value by displaying a list of settings and prompting the user to select a setting. Choices when the list of settings is displayed are called choices 1106 of the setting item.

In the example of the easy setting screen 1100b, the choices 1106 of the setting item are "A5", "B5", "A4", and the like. A description "choices of the setting item are displayed" represents that not only one choice but all choices are displayed. At this time, the easy setting screen 1100 and the full-function setting screen 1200 may have the same setting item. In principle, when a value is set on one setting screen, the same value is set on the other setting screen. In the example of the easy setting screen 1100a and full-function setting screen 1200a, such setting items are the setting item 1105 and a setting item 1202 as the setting of the output paper size.

Next, the easy setting screen 1100 and the full-function setting screen 1200 will be explained. The full-function setting screen 1200 is a setting screen including the setting items of all functions in the device application 1052. Although not all settings are seen from the drawing of the full-function setting screen 1200a, the remaining settings can be seen by flicking right and left the full-function setting screen 1200a or performing a scroll operation.

The easy setting screen 1100 is a UI screen which summarizes some of functions (setting items) frequently used by the user among the setting items of the full-function setting screen 1200. If setting of the device application is merely performed, only the full-function setting screen 1200 suffices. However, to do this, all the setting items present in the full-function setting screen 1200 need to be checked, placing a burden on the operation. In addition, in most cases, the number of parameters set for one printing is not so large. Considering this, frequently used functions are collected as the easy setting screen 1100 from the respective categories of the full-function setting screen 1200.

On the easy setting screen 1100, in addition to the above-described feature, even the choices 1106 of setting items are narrowed to those considered to be frequently used. In the example of the easy setting screen 1100b and full-function setting screen 1200b, there are 24 choices 1203 of a setting item on the full-function setting screen 1200b, but there are five choices 1106 of the setting item on the easy setting screen 1100b as a subset of the choices 1203.

In the above description, the target is the paper size. However, the same processing as that in this embodiment is possible as long as the number of choices of a setting item is different between the easy setting screen 1100 and the full-function setting screen 1200. For example, the target may be the "paper type" (FIG. 7A) for setting plain paper, photo paper, or the like, or the staple position designation (FIG. 7B). In addition, a combination of setting items of the full-function setting screen 1200 may be associated with one setting item on the easy setting screen 1100. A "layout" print function (FIG. 7C) of fitting a plurality of pages on one paper sheet will be exemplarily explained. In this case, a combination of choices of a layout setting item 702 and page order setting item 703 on the full-function setting screen 1200 is associated with a setting item 701 of easy setting.

Device application invoke processing will be described below. First, the problem of display processing in this flow and a solution will be explained in short. The easy setting screen 1100 and the full-function setting screen 1200 are different in the display number of choices of the setting item on the respective screens, as described in the above precondition. For this reason, a value not provided on the easy setting screen 1100 may be set on the full-function setting screen 1200. For example, assume that a value "A3" absent among the choices 1106 of the setting item is set as a current setting value upon shift to the easy setting screen 1100. At this time, the easy setting screen 1100 does not have a control corresponding to the value "A3" and cannot display it. Also, rounding the value to a default value is not preferable because the value set by the user is discarded only by transition of the screen.

To solve this problem, when a value absent among the choices 1106 of the setting item on the easy setting screen 1100 is set, a control corresponding to the absent value ("A3" in the above example) is automatically added to the easy setting screen 1100 in the first embodiment. Also, processing of setting this value as a current setting value on the easy setting screen 1100 is performed. As a result, the easy setting screen 1100 can provide an operation to even a user who uses a specific paper size absent among the choices 1106 of the setting item.

Figure 8:
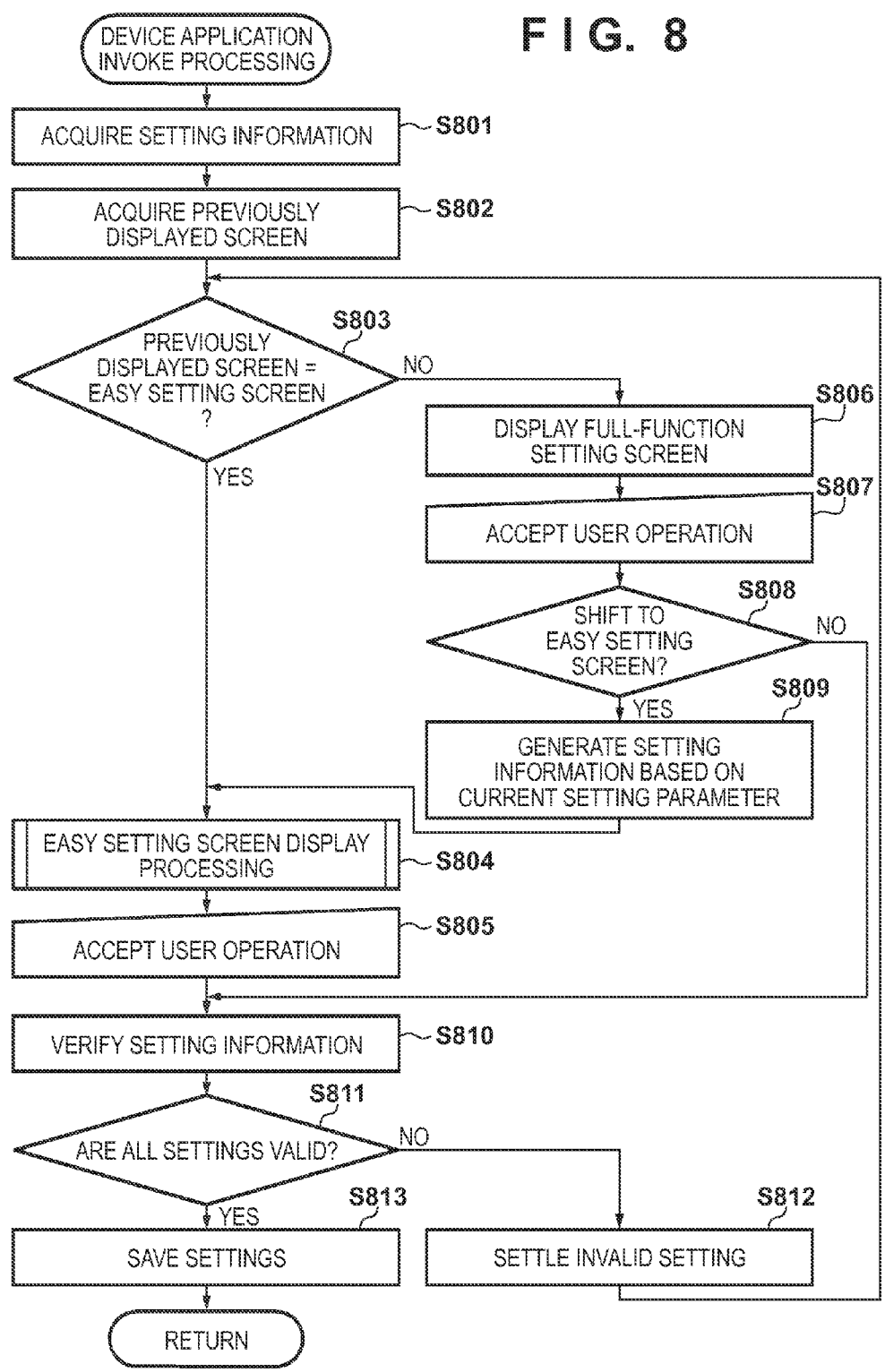
FIG. 8 is a flowchart showing the whole setting processing for an easy setting screen and a full-function setting screen.

FIG. 8 is a flowchart showing the whole setting processing for the easy setting screen and the full-function setting screen. Device application invoke processing will be explained below with reference to FIG. 8.

In step S801, the device application 1052 acquires the setting information 311 from the printer driver 1053 via the print subsystem 10540.

In step S802, the device application 1052 acquires a previously displayed screen based on the acquired setting information 311. In this flow, which of the easy setting screen 1100 and the full-function setting screen 1200 was open finally is acquired by this processing. In the case of a mechanism that switches a plurality of pages or tabs, the state of a finally closed page or tab may be acquired. In the case of a mechanism accompanied by scrolling, the scroll position may be acquired.

In step S803, the device application 1052 determines, based on the acquisition result in step S802, whether the previous screen displayed finally is the easy setting screen. If the easy setting screen was displayed, the device application 1052 shifts to step S804. If the easy setting screen was not displayed, the device application 1052 shifts to step S806 to display the full-function setting screen.

As for the easy setting screen, the device application 1052 first displays the easy setting screen 1100 in step S804, details of which will be described later. In step S805, the device application 1052 accepts an input complying with the displayed UI. In step S806, the device application 1052 displays the full-function setting screen 1200. At this time, an initial parameter is set based on the setting information 311 acquired in step S801. In step S807, the device application 1052 accepts an input complying with the displayed UI.

In step S808, the device application 1052 determines whether the button 1102 to shift to easy setting has been pressed. If the button 1102 has been pressed, the device application 1052 generates the setting information 311 from the current setting parameter (step S809), and shifts to easy setting screen display processing in step S804. At this time, the setting parameter may be transferred as a variable of an internal program without generating the setting information 311. When the screen does not shift to the easy setting screen 1100, the flow shifts to setting information verification processing in step S810.

In step S810, the setting analysis unit 301 of the configuration module 10530 verifies the setting information 311 generated on the easy setting screen 1100 or the full-function setting screen 1200. Although the configuration module 10530 of the printer driver 1053 includes the setting analysis unit 301 in this description, the device application 1052 may include the setting analysis unit 301.

In step S811, the configuration module 10530 determines, based on the verification result in step S810, whether the setting is valid. If the configuration module 10530 determines that the setting is valid, it saves device application-related settings including the print-related setting information 311 and the previously displayed screen setting (step S813). If the setting is invalid, the flow shifts to step S812.

In step S812, the configuration module 10530 settles the invalid setting. For example, processing of rounding an invalid setting to a specific value is performed though this changes depending on the system or the processing system. Processing of, for example, displaying a message regarding an invalid setting or displaying an icon that calls attention to an invalid setting portion may also be performed.

Figure 9:
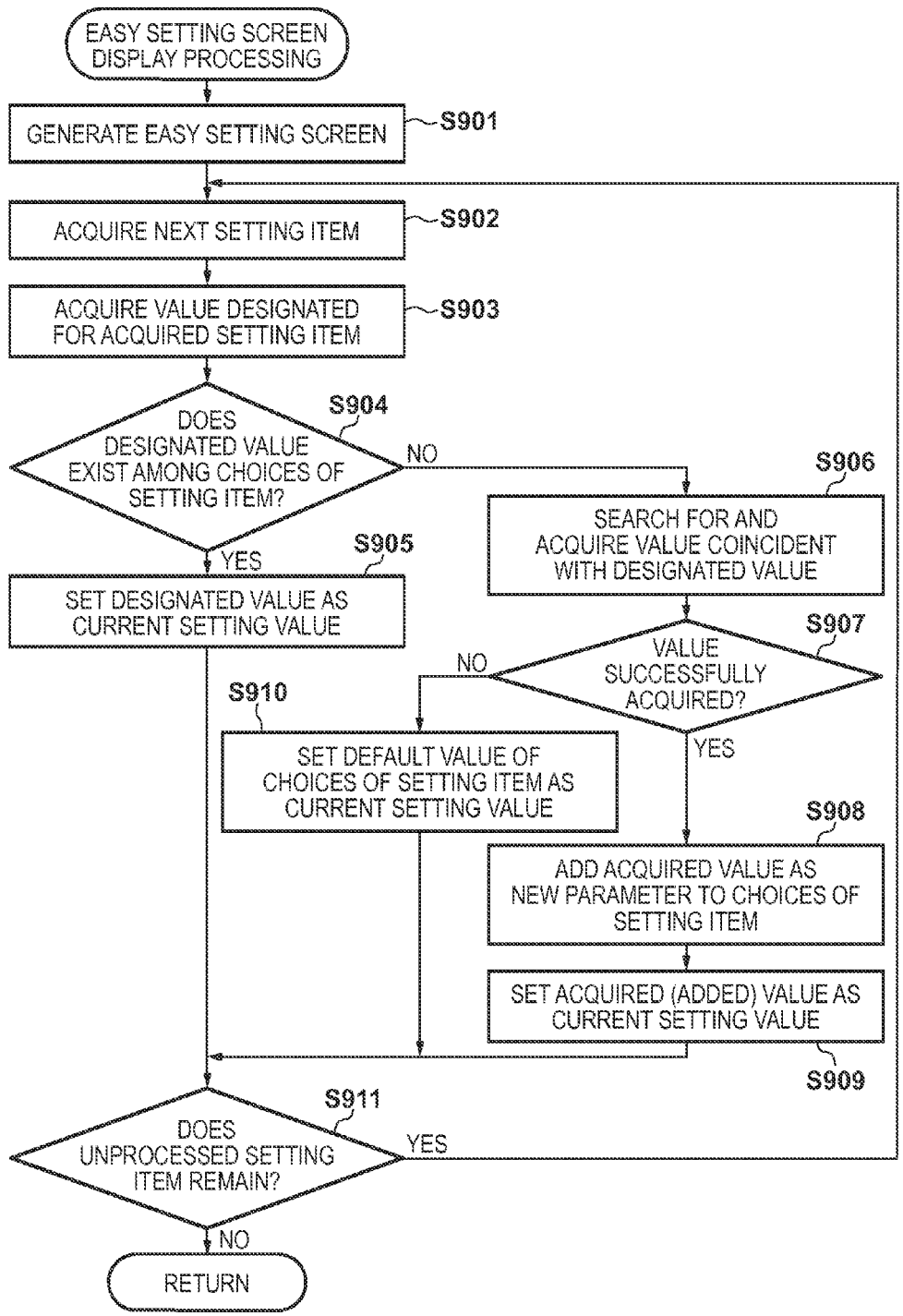
FIG. 9 is a flowchart showing easy setting screen display processing.

FIG. 9 is a flowchart showing easy setting screen display processing.

In step S901, the device application 1052 performs easy setting screen generation processing. At this time, processing necessary for screen display including initialization of UI parts is performed. In the next and subsequent steps, acquisition of setting values for respective setting items, and settlement when a setting value does not exist among choices of a setting item are performed.

In step S902, the device application 1052 shifts to processing for an unprocessed setting item. In the example of the easy setting screen 1100b, first, the copy count setting item 1104 is acquired. When this processing is invoked next time, the output paper size setting item 1105 is acquired. In this case, setting items are acquired in order from the top plainly. However, this order may be the index order of internal data, or may be changed in consideration of the collision between setting items.

In step S903, the device application 1052 acquires a value designated as a current setting value for the setting item by using the setting information 311. For example, when the current target is the setting item 1105 targeting the paper size, the value "A4" is a setting value to be acquired.

In step S904, the device application 1052 determines whether the parameter acquired in step S903 exists among choices (a set including a plurality of setting values) of the setting item. The easy setting screen 1100b will be exemplarily explained. If "A4" is designated as the setting value of the output paper size, the choices 1106 of the setting item include "A4", and it is determined that the parameter exists. If "A3" is designated as the setting value of the output paper size, the choices 1106 of the setting item do not include "A3", and it is determined that the parameter does not exist.

If it is determined that the parameter acquired in step S903 exists among the choices of the setting item, the designated value, for example, "A4" is set as a current setting value (step S905). If it is determined that the parameter acquired in step S903 does not exist, processing in step S906 and subsequent steps to automatically add a control corresponding to the absent value ("A3" in the above-mentioned example) and set it as a current setting value is performed.

In step S906, the device application 1052 performs processing of acquiring a designated value as a current setting value. Since values corresponding to the setting items of the easy setting screen 1100 also exist on the full-function setting screen 1200, these values are referred to. In the above-mentioned example, when a value absent in the setting item 1105 targeting the paper size on the easy setting screen 1100 has been designated, the corresponding setting item 1202 in the full-function setting screen 1200 is searched for a corresponding value.

At this time, a coincident value is acquired not as simple text information, but a value including even the function and setting of a UI control. More specifically, as for "A3", not only simple text information "A3", but also styles such as the font type, character size, and color, and registration information of a function that is invoked upon selecting "A3" are also acquired together. Note that the destination from which this value is acquired may be not a corresponding UI, but may be searched from a database registered in advance.

In step S907, the device application 1052 determines whether a value designated as the setting value has been acquired. If the value has been acquired, the flow shifts to step S908. If the value has not been acquired, the device application 1052 shifts to step S910.

In step S908, the device application 1052 adds the acquired value to the choices of the selected item. When "A3" is added to the choices 1106 of the setting item on the easy setting screen 1100b, the choices 1106 are changed to six items "A5, B5, A4, B4, A3, postcard".

In step S909, the device application 1052 sets the value added in step S908 as a current setting value. As a result, "A3" is selected.

When a value designated as the setting value could not be acquired (for example, when an incompatible size such as "medium octavo" is designated), a default value (for example, "A4") among the choices of the setting item is set in step S910. This step is not executed only by normally selecting a choice, but may be executed when a set of print settings is externally imported, or when the arrangement of the device is changed (for example, a device used is detached).

In step S911, the device application 1052 determines whether an unprocessed setting item remains. If an unprocessed setting item remains, the device application 1052 returns to step S902. If no unprocessed setting item remains, the device application 1052 ends the flow.

Note that another method is also conceivable, other than the above-described method of acquiring all parameters. For example, controls are prepared in advance on the easy setting screen 1100 by the same number as those of the full-function setting screen 1200. Unnecessary controls are normally hidden, and only when a corresponding control is requested, the control is displayed. Such a simple method is also possible. In this case, acquisition of a value is replaced with processing of receiving a flag "validate an item", and the step of adding a value to choices is replaced with processing "display a hidden item".

Figure 10:
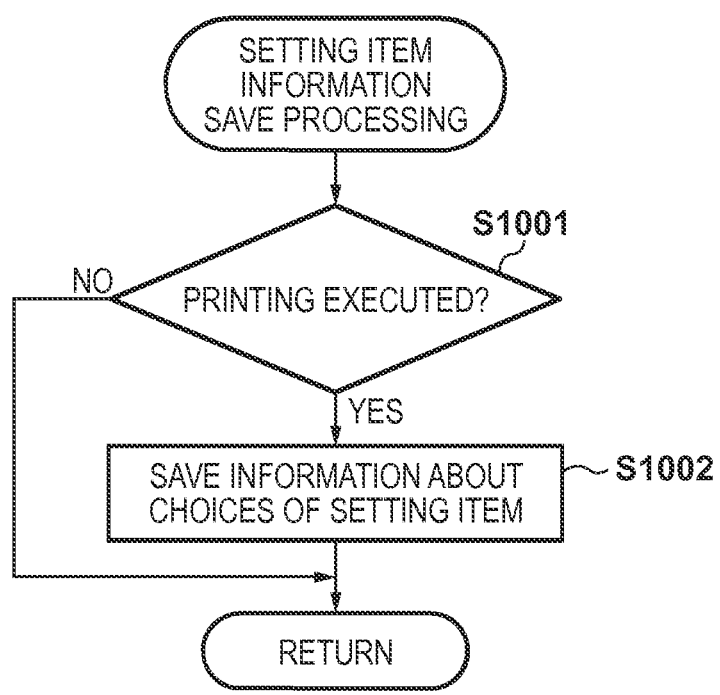
FIG. 10 is a flowchart showing setting item information save processing.

FIG. 10 is a flowchart showing setting item information save processing. When a choice of a setting item is added in display processing of the easy setting screen 1100, the added value needs to be saved as a setting value. Note that this flow is performed at an arbitrary timing after step S509 of main print processing.

In step S1001, the device application 1052 first determines whether printing has been executed. If printing has been executed, the device application 1052 shifts to step S1002. If printing has been canceled, the device application 1052 ends the flow.

In step S1002, the device application 1052 saves information about choices of setting items (save control unit). This information includes values added as choices of setting items, and current setting values, and is stored in the setting information 311. The setting information may be a difference from a default value, or the entire information may be saved.

As described above, according to the first embodiment, when a setting value not provided on the easy setting screen is set on the full-function setting screen, this setting value is added to a control on the easy setting screen. This setting value can be displayed and operated even on the easy setting screen.

(Second Embodiment)

The second embodiment will explain another processing when adding a setting value not provided on an easy setting screen 1100. More specifically, a related setting value is added together.

As described in the first embodiment, choices 1106 of a setting item on the easy setting screen 1100 are narrowed to those frequently used by a user. However, it is sometime preferable to register a plurality of choices (for example, paper sizes) for a user in a special environment or a user not supposed by the provider of the easy setting screen 1100. For example, it may be preferable for an American company to display not sizes such as "A4" but sizes "letter", "ledger", and "legal". Also, it may be preferable for office printing to register choices regarding "envelope" altogether. Considering this, the second embodiment will describe processing of, when adding a value not provided on the easy setting screen 1100, registering even an item regarding the value to be added.

Figure 13:
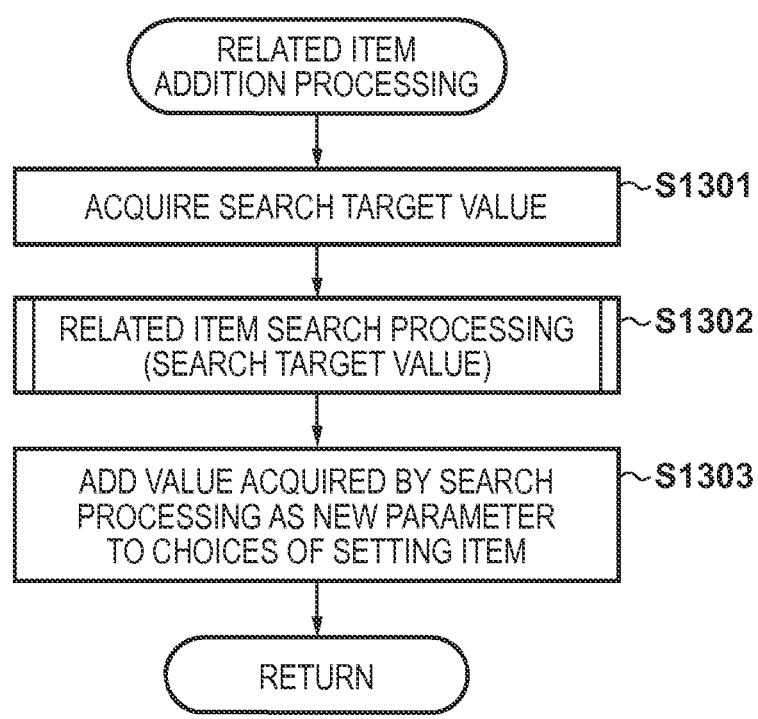
FIG. 13 is a flowchart showing related item addition processing.

FIG. 13 is a flowchart showing related item addition processing. Note that this flow is invoked immediately after processing of step S909 to add a choice in the flow of FIG. 9 in which easy setting screen display processing is performed.

In the following description, an example will be explained, in which when "letter" is selected on a full-function setting screen 1200, a total of three choices "letter", "ledger", and "legal" are added to the choices 1106 of the setting item on the easy setting screen 1100.

In step S1301, a device application 1052 acquires a search target value through setting information 311. Since the value "letter" is selected on the full-function setting screen 1200, the value "letter" is acquired.

In step S1302, the device application 1052 performs related item search processing to acquire a related item. Although details of this processing will be described later, the processing to be described below is merely an example and the search for a related item may use another algorithm or method. The values "ledger" and "legal" can be acquired as items related to "letter".

In step S1303, the device application 1052 adds values acquired as related items, that is, the values "ledger" and "legal" to the choices 1106 of the setting item on the easy setting screen 1100.

Figure 14:
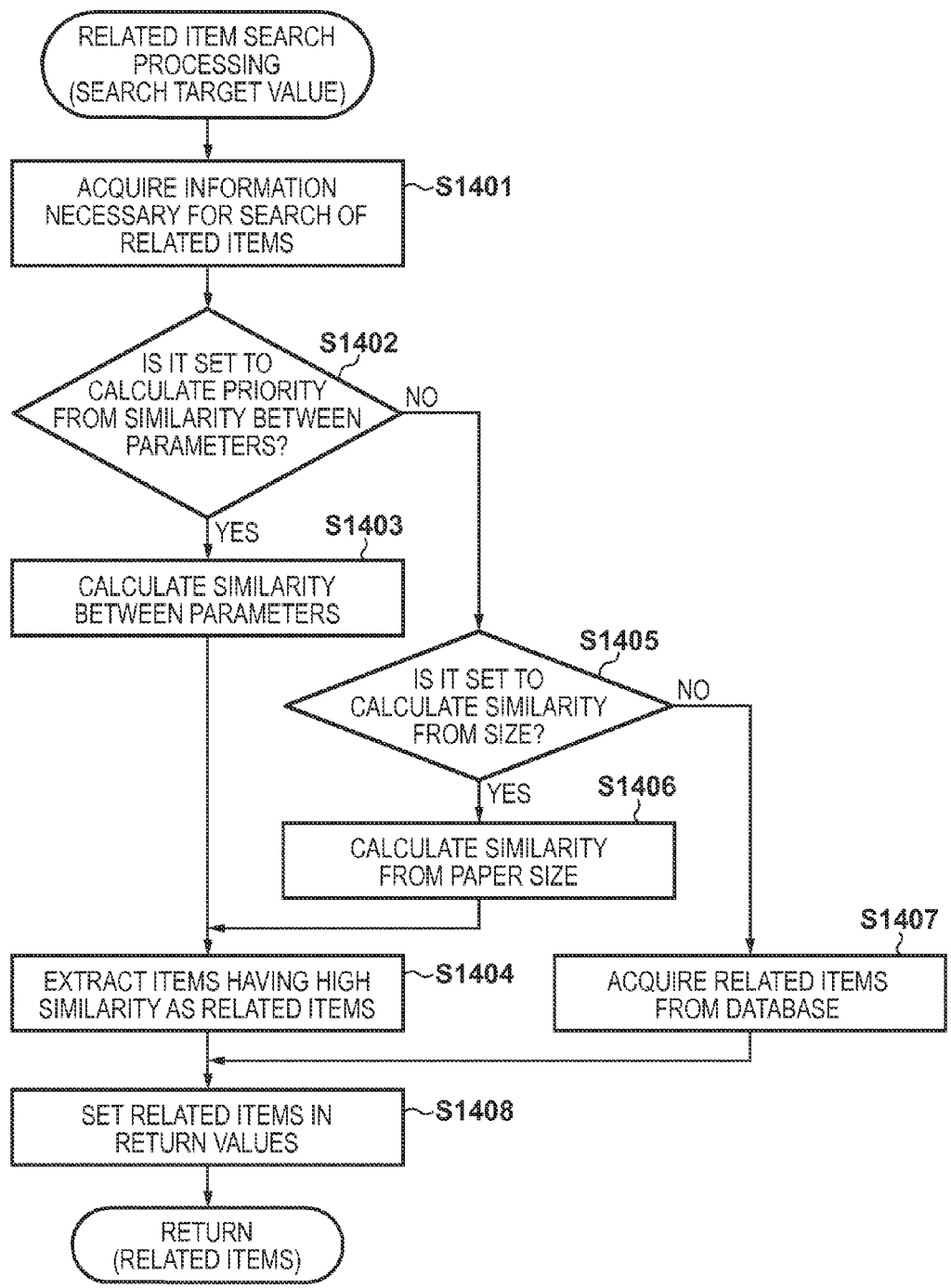
FIG. 14 is a flowchart showing related item search processing.

FIG. 14 is a flowchart showing the related item search processing (step S1302). A method of searching for a related item based on the similarity between parameters, a method of searching for a related item having a similar size, and a method of searching for a related item in accordance with information registered in advance in a database will be explained here.

In step S1401, the device application 1052 acquires information necessary for search processing of this flow from the setting information 311. This information is equivalent to information about the type of search processing to be performed, information about the assignment of priority or the threshold, or the like.

In step S1402, the device application 1052 determines whether it is set to calculate priority from the similarity between parameters. If it is set to calculate priority from the similarity between parameters, the device application 1052 shifts to step S1403. If it is not set to calculate priority from the similarity between parameters, the device application 1052 shifts to step S1405.

In step S1403, the device application 1052 calculates the similarity between parameters. For paper, parameters for identifying data are internally stored in addition to a displayed text.

Data stored in a public setting item 401 of a setting list 310 will be exemplified. For "letter", a "psk:NorthAmericaLetter" parameter 403 is defined. Similarly, "psk:NorthAmericaTabloid" is set for "ledger", and "psk:JapanHagakiPostcard" is set for "postcard". By using these parameters, the similarity is calculated. For example, a similarity with "letter (psk:NorthAmericaLetter)" is measured by measurement of the Levenshtein distance. In this case, the similarity is higher for "ledger (psk:NorthAmericaTabloid)" than for "postcard (psk:JapanHagakiPostcard)" because "ledger (psk:NorthAmericaTabloid)" includes the same text "NorthAmerica" as that of the letter.

In step S1404, the device application 1052 extracts, as related items, items each having a similarity equal to or higher than a predetermined threshold, or some items from the top of the similarity. When extracting related-items, settings such as which of threshold-based items and several items from the top are used, the concrete threshold, and the number of items to be extracted from the top comply with those acquired in step S1401 described above.

Another parameter may also be used as long as it can be associated with a search target value ("letter" in this case). At this time, the method of calculating the similarity is not limited to the Levenshtein distance used in the description of this example, and is arbitrary as long as the algorithm can convert the similarity (or difference) of a parameter into a numerical value.

In step S1405, the device application 1052 determines whether it is set to calculate the similarity from the size. If it is set to calculate the similarity from the size, the device application 1052 shifts to step S1406; otherwise, the device application 1052 shifts to step S1407.

In step S1406, the device application 1052 calculates the similarity from the paper size. For example, the sums each of the length and breadth of paper are arranged in order, and the similarity between close sums is determined to be high. Calculation of the similarity may use the standard deviation or the like as long as the closeness between values can be determined. It is also possible to, for example, weight the numerical values of the length and breadth.

In step S1407, the device application 1052 acquires related-items in accordance with the database registered in advance. For example, when three items "letter, "ledger", and "legal" are associated in advance as the same group, and one of the three items is a target, the remaining two items are acquired as related-items.

In step S1408, the device application 1052 sets, in return values, the values extracted as the related-items.

As described above, according to the second embodiment, when a setting value is added to the easy setting screen, setting values related to this setting value can also be added together with the added setting value.

(Third Embodiment)

The third embodiment will explain processing of sharing settings between a plurality of printers. As described in the above embodiments, a device application 1052 is the auxiliary application of a printer driver 1053. An arrangement is also conceivable, in which one device application 1052 is associated with a plurality of printer drivers 1053. For example, when there are a plurality of printers in the office, a case (for example, monochrome application or color application) in which a plurality of printers are separately invoked from one PC is assumed. At this time, when common print settings are to be used, it is necessary to invoke all the printers, make settings, and then execute printing according to the above-described embodiments. To reduce such complication, the third embodiment will explain processing of sharing settings between printers.

Figure 15:
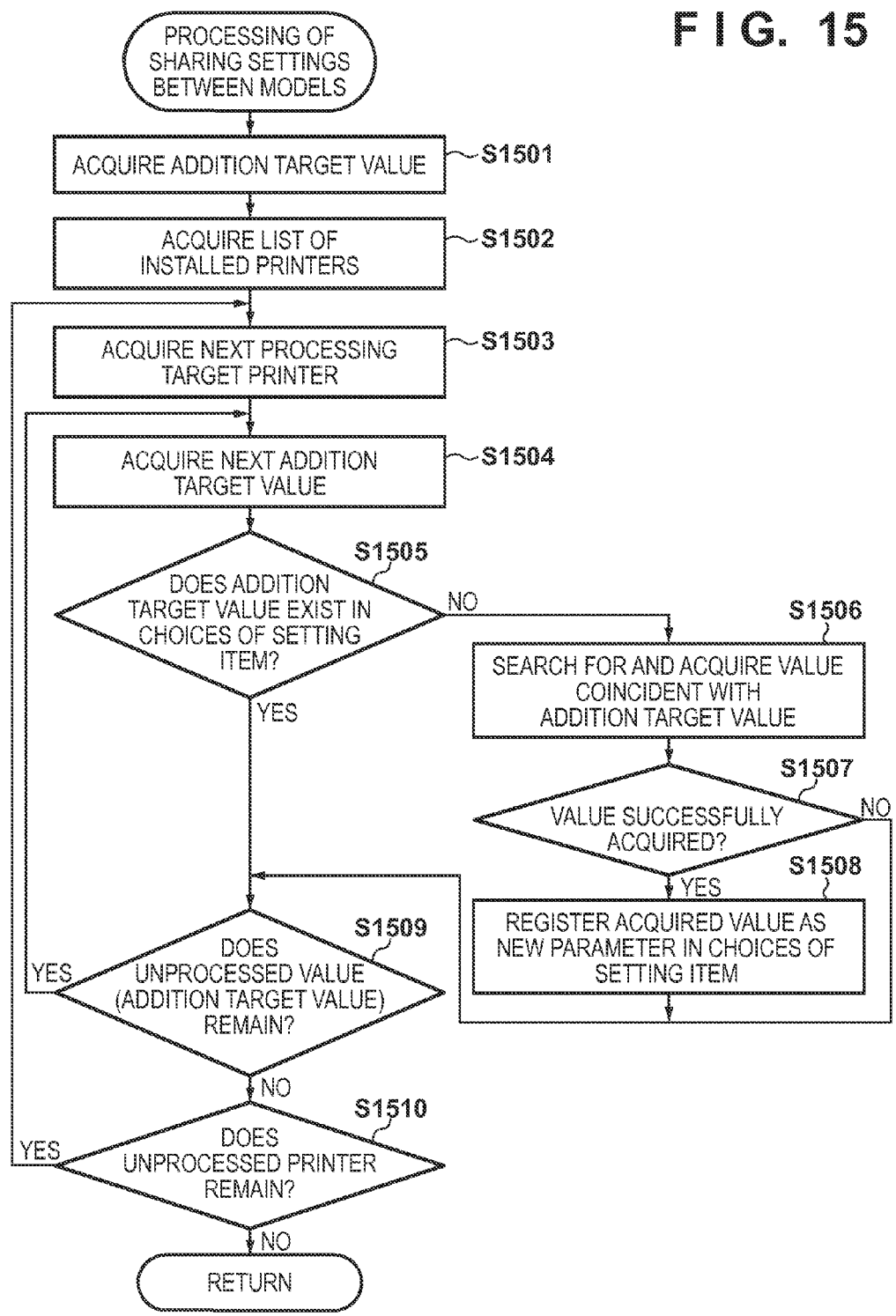
FIG. 15 is a flowchart showing processing of sharing settings between a plurality of models.

FIG. 15 is a flowchart for explaining processing of sharing settings between a plurality of models. This flow is performed at an arbitrary timing after performing print setting save processing in FIG. 10 after step S509 of main print processing.

In step S1501, the device application 1052 acquires an addition target value. The addition target value includes "A3" selected by the user in the example according to the first embodiment, or a total of three values, that is, "letter" selected by the user and "ledger" and "legal" to be added together in the example according to the second embodiment.

In step S1502, the device application 1052 acquires a list of printers installed in the system.

In step S1503, the device application 1052 acquires a processing target printer among the printers acquired in step S1502. This printer is a printer that can be invoked from the device application 1052.

In step S1504, the device application 1052 sequentially acquires unprocessed values that have been acquired in step S1501 and are to be added.

In step S1505, the device application 1052 determines whether the addition target value exists among choices 1106 of the setting item. The choices 1106 of the setting item at this time are choices associated with a setting linked to the printer driver 1053 serving as the current processing target. If the addition target value already exists among the choices 1106 of the setting item, the device application 1052 shifts to step S1509. If the addition target value does not exist, the device application 1052 shifts to step S1506.

In step S1506, the device application 1052 searches for and acquires a value coincident with the addition target value. Note that this processing is the same as the processing in step S906, and a description thereof will not be repeated.

In step S1507, the device application 1052 determines whether the value has been acquired in step S1506. If the value has been acquired, the device application 1052 shifts to step S1508. If the value has not been acquired, the device application 1052 shifts to step S1509. The case in which the value could not be acquired means that the addition target value cannot be used in executing printing by the current target printer of interest.

In step S1508, the device application 1052 performs processing of adding the value acquired in step S1506 as a new parameter to choices of the setting item. Note that this processing is the same as the processing in step S908, and a description thereof will not be repeated.

In step S1509, the device application 1052 determines whether an unprocessed value remains. If an unprocessed value remains, the device application 1052 returns to acquisition (step S1504) of the next value to be added. If no unprocessed value remains, the device application 1052 shifts to step S1510.

In step S1510, the device application 1052 determines whether an unprocessed printer remains. If an unprocessed printer remains, the device application 1052 returns to acquisition (step S1503) of the next target printer. If no unprocessed printer remains, the device application 1052 shifts to end processing of the flow.

Figure 16:
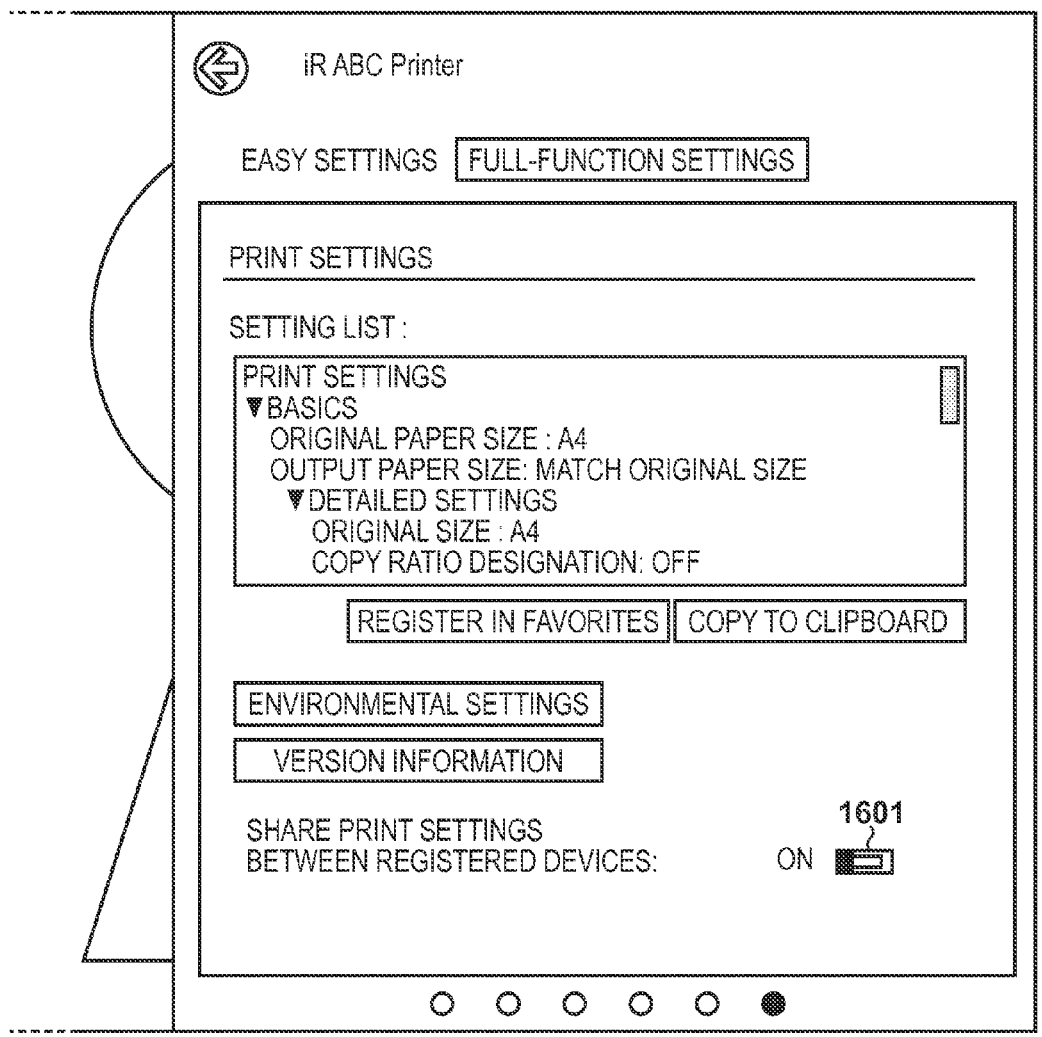
FIG. 16 is a view showing a setting screen for sharing settings between a plurality of models.

In order to designate whether to perform the above-described processing, for example, a toggle switch 1601 as exemplified in FIG. 16 may be used. Instead of the toggle switch, it may also be configured to use a check box or a pull-down menu. That is, it is only necessary to switch or designate validation/invalidation of a setting.

As described above, processing of sharing settings between different models can be easily performed by the processing according to the third embodiment.

(Fourth Embodiment)

The fourth embodiment will describe setting item choice deletion processing. The first to third embodiments have explained processing of adding an item to the choices 1106 of a setting item. However, if items are added unlimitedly, the purpose "decrease choices for clarity" of the easy setting screen is not achieved. Therefore, a method of preferably deleting choices of a setting item will be explained below.

FIG. 17 is a flowchart for explaining setting item choice deletion processing. As the timing to execute this flow, the flow is invoked after an item is added (step S909) or after a value is simply set (step S910). Alternatively, the flow may be invoked at an arbitrary timing.

In step S1701, a device application 1052 acquires information about a deletion condition. As the condition to determine whether the number of setting values (choices) is increasing, an upper limit value (predetermined value) is acquired. In step S1702, the device application 1052 acquires information about the priority of deletion (deletion priority).

In step S1703, the device application 1052 determines whether choices of a selected item have reached the criterion of deletion. If a choice is to be deleted, the device application 1052 shifts to step S1704. If the choices have not reached the criterion of deletion, the device application 1052 ends the flow.

The condition regarding this processing will be described. Several patterns are conceivable as the deletion condition. First, the determination is made based on whether the number of choices has exceeded an upper limit value registered in advance. The determination may also be made based on whether the screen height (height attribute value) of a control in the list display of choices 1106 of the setting item becomes a value of a predetermined height or more. As the condition of the predetermined height or more, for example, the height of the screen may be acquired from the resolution, and it may be determined whether the height attribute value becomes equal to or larger than the predetermined height. The height of an arbitrary region such as the height of a setting portion control 1107 on an easy setting screen 1100 may be used as the reference. In addition, designation of the number of items or a numerical value corresponding to the screen height may be accepted from a user.

In step S1704, the device application 1052 deletes one or more choices based on the deletion priority. Although it is assumed to delete one item of highest deletion priority, it may be configured to delete a plurality of items. When deleting a plurality of items, it may also be configured to delete other items registered as the same group.

Several examples of the deletion priority will be described. First, there is a simple method of arranging choices in an order in which new ones were added, like a stack, and deleting choices from the oldest one (added first). Second, there is a method of storing the time when a choice was registered, and deleting a choice upon the lapse of a predetermined time or more. Third, there is a method of recording a use frequency, and deleting a choice in the ascending order of the use frequency.

As described in the above embodiments, there are conceivable a method of preferentially deleting a choice which was not explicitly selected by a user but was automatically added by the system, and a method of decreasing the deletion priority for choices registered in the favorites, the history, and another item such as a preset value. Note that the plurality of conditions may be used together. At this time, a basic method used in a combination of determination conditions, such as weighting, may be applied, as a matter of course. Also, targets to be deleted may include an item, such as "A5", originally included in the choices 1106 of the setting item.

As described above, choice deletion processing can be performed by the processing according to the fourth embodiment, and choices can be prevented from increasing excessively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086801, filed Apr. 18, 2014, which is hereby incorporated by reference herein in its entirety.

What is claimed is:

1. An information processing apparatus that performs setting of a print setting item used in a printing device, comprising:

a first setting unit configured to accept setting of a setting value to a predetermined print setting item via a first user interface screen configured to select one setting value from a first set including a plurality of setting values;

a second setting unit configured to accept setting of a setting value to the predetermined print setting item via a second user interface screen configured to select one setting value from a second set serving as a subset of the first set;

a determination unit configured to determine whether or not the setting value set by the first setting unit is comprised in the second set; and an addition unit configured to, if the determination unit determines that the setting value set by said first setting unit is not included in the second set, add the setting value set by said first setting unit to the second set, wherein the first user interface screen and the second user interface screen are displayed by selecting a link arranged on a third user interface screen provided by an operating system running in the information processing apparatus.

2. The apparatus according to claim 1, further comprising a save control unit configured to, if the printing device executes printing using the setting value added by said addition unit, save the second set to which the setting value has been added by said addition unit, and if the printing device cancels printing using the setting value added by said addition unit, discard the second set to which the setting value has been added by said addition unit.

3. The apparatus according to claim 1, wherein if said addition unit adds the setting value set by said first setting unit, said addition unit adds another setting value related to the setting value.

4. The apparatus according to claim 3, wherein the other setting value includes a setting value designated as the same group as a group of the setting value set by said first setting unit.

5. The apparatus according to claim 1, further comprising a deletion unit configured to, if the number of setting values included in the second set exceeds a predetermined value by addition of the setting value by said addition unit, delete at least one setting value included in the second set.

6. The apparatus according to claim 5, wherein the predetermined value is set in advance as an upper limit value of a screen height of a list display when the setting values included in the second set are listed and displayed.

7. The apparatus according to claim 5, wherein said deletion unit deletes at least one setting value included in the second set in accordance with deletion priority set in advance for each of the setting values included in the second set.

8. The apparatus according to claim 1, wherein
the information processing apparatus is configured to be able to set, via said first setting unit and said second setting unit, setting of a print setting item used in another printing device, and
if a setting value set by said first setting unit is added to the second set for the predetermined print setting item of the printing device, said addition unit adds the setting value set by said first setting unit to even the second set for the predetermined print setting item of the other printing device.

9. The apparatus according to claim 8, wherein even if a setting value set by said first setting unit is added to the second set for the predetermined print setting item of the printing device, and if the setting value cannot be used for execution of printing in the other printing device, said addition unit does not add the setting value to the second set for the predetermined print setting item of the other printing device.

10. A method of controlling an information processing apparatus that performs setting of a print setting item used in a printing device, comprising:
accepting setting of a setting value to a predetermined print setting item via a first user interface screen configured to select one setting value from a first set including a plurality of setting values;
accepting setting of a setting value to the predetermined print setting item via a second user interface screen configured to select one setting value from a second set serving as a subset of the first set;
determining whether or not the set setting value of the first set is comprised in the second set; and
if it is determined that the setting value set via the first user interface screen is not included in the second set, adding, to the second set, the setting value set via the first user interface screen,
wherein the first user interface screen and the second user interface screen are displayed by selecting a link arranged on a third user interface screen provided by an operating system running in the information processing apparatus.

11. The method according to claim 10, further comprising, if the printing device executes printing using the setting value added in the adding, saving the second set to which the setting value has been added in the adding, and if the printing device cancels printing using the setting value added in the adding, discarding the second set to which the setting value has been added in the adding.

12. The method according to claim 10, wherein in the adding, if the setting value set via the first user interface screen is added, another setting value related to the setting value is added.

13. The method according to claim 12, wherein the other setting value includes a setting value designated as the same group as a group of the setting value set via the first user interface screen.

14. The method according to claim 10, further comprising, if the number of setting values included in the second set exceeds a predetermined value by addition of the setting value in the adding, deleting at least one setting value included in the second set.

15. The method according to claim 14, wherein the predetermined value is set in advance as an upper limit value of a screen height of a list display when the setting values included in the second set are listed and displayed.

16. The method according to claim 14, wherein in the deleting, at least one setting value included in the second set is deleted in accordance with deletion priority set in advance for each of the setting values included in the second set.

17. The method according to claim 10, wherein
the information processing apparatus is configured to be able to set, via the first user interface screen and the second user interface screen, setting of a print setting item used in another printing device, and
in the adding, if a setting value set via the first user interface screen is added to the second set for the predetermined print setting item of the printing device, the setting value set via the first user interface screen is added to even the second set for the predetermined print setting item of the other printing device.

18. The method according to claim 17, wherein in the adding, even if a setting value set via the first user interface screen is added to the second set for the predetermined print setting item of the printing device, and if the setting value cannot be used for execution of printing in the other printing device, the setting value is not added to the second set for the predetermined print setting item of the other printing device.

19. A non-transitory computer-readable recording medium storing a program for causing a computer to function as an information processing apparatus that performs setting of a print setting item used in a printing device, the program causing the information processing apparatus to further function as:
- a first setting unit configured to accept setting of a setting value to a predetermined print setting item via a first user interface screen configured to select one setting value from a first set including a plurality of setting values;
- a second setting unit configured to accept setting of a setting value to the predetermined print setting item via a second user interface screen configured to select one setting value from a second set serving as a subset of the first set;
- a determination unit configured to determine whether or not the setting value set by the first setting unit is comprised in the second set; and
- an addition unit configured to, if the determination unit determines that the setting value set by said first setting unit is not included in the second set, add the setting value set by said first setting unit to the second set,
- wherein the first user interface screen and the second user interface screen are displayed by selecting a link arranged on a third user interface screen provided by an operating system running in the information processing apparatus.

* * * * *